United States Patent
Verroios et al.

(10) Patent No.: US 10,489,745 B1
(45) Date of Patent: Nov. 26, 2019

(54) APPARATUS, SYSTEM AND METHOD OF CLUSTERING CLIENTS BASED ON THEIR HIRING CRITERIA IN A JOB MARKETPLACE

(71) Applicant: Upwork Inc., Mountain View, CA (US)

(72) Inventors: Vasilis Verroios, Stanford, CA (US); Ramesh Johari, San Francisco, CA (US); Panagiotis Papadimitriou, Menlo Park, CA (US)

(73) Assignee: UPWORK, INC., Mountain View, CA (US)

( * ) Notice: Subject to any disclaimer, the term of this patent is extended or adjusted under 35 U.S.C. 154(b) by 499 days.

(21) Appl. No.: 14/821,557

(22) Filed: Aug. 7, 2015

Related U.S. Application Data

(60) Provisional application No. 62/034,580, filed on Aug. 7, 2014.

(51) Int. Cl.
| | | |
|---|---|---|
| *G06Q 10/10* | (2012.01) | |
| *G06Q 30/02* | (2012.01) | |
| *G06Q 30/08* | (2012.01) | |
| *G06Q 10/06* | (2012.01) | |
| *G06F 17/18* | (2006.01) | |
| *G06F 16/28* | (2019.01) | |

(52) U.S. Cl.
CPC ....... *G06Q 10/1053* (2013.01); *G06F 16/285* (2019.01); *G06F 17/18* (2013.01)

(58) Field of Classification Search
CPC .................................................................
G06Q 10/1053; G06Q 10/1057; G06Q 50/01
USPC .......................... 705/1.1–912, 319, 320, 321
See application file for complete search history.

(56) References Cited

U.S. PATENT DOCUMENTS

| | | | |
|---|---|---|---|
| 6,466,914 B2 * | 10/2002 | Mitsuoka | G06Q 10/06311 705/37 |
| 6,735,570 B1 | 5/2004 | Lacy | |
| 7,096,193 B1 | 8/2006 | Beaudoin | |
| 7,466,810 B1 | 12/2008 | Quon | |
| 9,020,271 B2 * | 4/2015 | Deolalikar | G06K 9/6219 382/197 |
| 2001/0034630 A1 | 10/2001 | Mayer | |
| 2003/0191684 A1 | 10/2003 | Lumsden | |
| 2005/0222907 A1 | 10/2005 | Pupo | |

(Continued)

*Primary Examiner* — Jonathan P Ouellette
(74) *Attorney, Agent, or Firm* — Haverstock & Owens LLP

(57) ABSTRACT

Embodiments of the present invention are directed to grouping clients in a work marketplace into clusters such that, in each cluster, clients are similar with respect to their hiring criteria. In some embodiments, the clusters are generated based on a clustering algorithm that can be applied effectively on large datasets. This separation allows the work marketplace to discover differences in client hiring criteria, to learn more accurately the hiring criteria in each cluster and to recommend the right contractor to each client for a successful collaboration, thereby improving matching between clients and contractors in the work marketplace. For each contractor who have submitted an application to a project posted by a client, a contractor/opening pair score is determined based on information of the cluster that is associated with the client. The contractor/opening pair score is used to ascertain whether the contractor would be a candidate recommended to the client.

20 Claims, 7 Drawing Sheets

(56) References Cited

U.S. PATENT DOCUMENTS

| | | | |
|---|---|---|---|
| 2006/0177041 A1* | 8/2006 | Warner | G06Q 10/02 |
| | | | 379/266.08 |
| 2007/0192130 A1 | 8/2007 | Sandhu | |
| 2008/0059523 A1 | 3/2008 | Schmidt | |
| 2009/0011395 A1 | 1/2009 | Schmidt | |
| 2009/0055404 A1 | 2/2009 | Heiden | |
| 2010/0017253 A1 | 1/2010 | Butler | |
| 2012/0265770 A1 | 10/2012 | Desjardins | |
| 2012/0290365 A1 | 11/2012 | Bramlett, Jr. | |
| 2014/0074738 A1* | 3/2014 | Thankappan | G06Q 10/10 |
| | | | 705/321 |
| 2015/0206080 A1* | 7/2015 | Izaguirre | G06Q 10/06 |
| | | | 705/7.36 |
| 2016/0012135 A1* | 1/2016 | Wang | G06F 17/30867 |
| | | | 707/731 |

* cited by examiner

APPARATUS, SYSTEM AND METHOD OF CLUSTERING CLIENTS BASED ON THEIR HIRING CRITERIA IN A JOB MARKETPLACE

RELATED APPLICATIONS

This application claims benefit of priority under 35 U.S.C. section 119(e) of the U.S. Provisional Patent Application Ser. No. 62/034,580, filed Aug. 7, 2014, entitled "Clustering Users Based on Their Hiring Criteria in Job Marketplaces," which is hereby incorporated by reference in its entirety.

FIELD OF INVENTION

The present invention relates to the field of computing. More specifically, the present invention relates to an apparatus, system and method of clustering clients based on their hiring criteria in a marketplace.

BACKGROUND OF THE INVENTION

Online work marketplaces help clients and contractors across the globe to connect with each other and work for more than $1 billion in annual contractor earnings just in the year 2014. Typically, in such marketplaces, contractors apply to jobs posted by clients and clients hire applicant(s) that seems to be the best fit for the jobs posted. As their platforms grow, a fundamental problem that the marketplaces have to solve is the understanding of successful client hiring practices such that the marketplaces can help clients make the right hiring decisions. Without such help, clients will have to deal with the friction of screening tens to hundreds of contractors to determine the ideal candidates for their jobs. The screening process is not only time consuming, but it is also error-prone since clients often lack the necessary knowledge to assess the qualifications of contractors (e.g., education and work experience from schools and companies that are unknown to a client). Understanding and modeling the hiring behavior of clients is challenging not only due to the variety of jobs that are posted and the diversity of contractors, but also due to the heterogeneity of client hiring criteria.

BRIEF SUMMARY OF THE INVENTION

Embodiments of the present invention are directed to grouping clients in a work marketplace into clusters such that, in each cluster, clients are similar with respect to their hiring criteria. In some embodiments, the clusters are generated based on a clustering algorithm that can be applied effectively on large datasets. This separation allows the work marketplace to discover differences in client hiring criteria, to learn more accurately the hiring criteria in each cluster and to recommend the right contractor to each client for a successful collaboration, thereby improving matching between clients and contractors in the work marketplace. For each contractor who have submitted an application to a project posted by a client, a contractor/opening pair score is determined based on information of the cluster that is associated with the client. The contractor/opening pair score is used to ascertain whether the contractor would be a candidate recommended to the client In one aspect, a system for detecting and analyzing differences between client criteria in different clusters is provided. The system includes a plurality of client clusters stored in a first database, wherein clients are grouped into the plurality of client clusters such that each client in a first of the plurality of client clusters has hiring criteria that is more similar to any other client in the first of the plurality of client clusters than to any client in a second of the plurality of client clusters. The system also includes a cluster model for each of the plurality of client clusters stored in the first database, wherein the cluster model is based on the hiring criteria associated with a corresponding client cluster. The system also includes a computing device. The computing device includes a processor and an application executed by the processor. The application is configured to perform iterative grouping of the clients such that candidate recommendations made by the computing device for a client are align with the hiring criteria of the cluster model that is associated with the client cluster the client is grouped in.

In some embodiments, the application is also configured to generate the plurality of client clusters, generate the cluster model for each of the plurality of client clusters, monitor collaborations in each of the plurality of client clusters, and based on the monitoring, re-adjust one or more of the cluster models.

In some embodiments, the application is also configured to perform training of the cluster models.

In some embodiments, a cluster model is trained when a number of members of a corresponding client clusters has increased by a predetermined threshold since the last training of the cluster model. Alternatively, a cluster model is trained periodically.

In some embodiments, the grouping of the clients and the training of the cluster models are performed offline by utilizing a second database such that the client clusters and the cluster models in the first database are not affected during the grouping and the training.

In some embodiments, the application is also configured to assign a new client who does not have a hiring history to one of the plurality of client clusters.

In some embodiments, the application is also configured to receive an application submitted by a contractor for an opening created by the client, access from the first database the client cluster that the client is grouped in and the cluster model that is associated with the client cluster, score the application submitted by the contractor for the opening based on the cluster model, and based on the scoring, determine whether to recommend the contractor to the client as a candidate for the job opening.

In some embodiments, the clients and the contractors are members of an online work marketplace.

In some embodiments, the application is also configured to re-score all existing application to active openings in the online work marketplace.

In another aspect, a computing device is provided. The computing device includes a processor and an application executed by the processor. The application configured to maintain a plurality of client clusters in a first database, wherein clients are grouped into the plurality of client clusters such that each client in a first of the plurality of client clusters has hiring criteria that is more similar to any other client in the first of the plurality of client clusters than to any client in a second of the plurality of client clusters. The application is also configured to maintain a cluster model for each of the plurality of client clusters in the first database, wherein the cluster model is based on the hiring criteria associated with a corresponding client cluster. The application is also configured to perform iterative grouping of the clients such that candidate recommendations made by the computing device for a client are align with the hiring criteria of the cluster model that is associated with the client cluster the client is grouped in.

In yet another aspect, a method of detecting and analyzing differences between client criteria in different clusters is provided. The method includes maintaining by a computing device a plurality of client clusters in a first database, wherein clients are grouped into the plurality of client clusters such that each client in a first of the plurality of client clusters has hiring criteria that is more similar to any other client in the first of the plurality of client clusters than to any client in a second of the plurality of client clusters, maintaining by the computing device a cluster model for each of the plurality of client clusters in the first database, wherein the cluster model is based on the hiring criteria associated with a corresponding client cluster, and performing by the computing device iterative grouping of the clients such that candidate recommendations made by the computing device for a client are align with the hiring criteria of the cluster model that is associated with the client cluster the client is grouped in.

In some embodiments, the method further includes generating by the computing device the plurality of client clusters, generating by the computing device the cluster model for each of the plurality of client clusters, monitoring by the computing device collaborations in each of the plurality of client clusters, and based on the monitoring, re-adjusting by the computing device one or more of the cluster models.

In some embodiments, the method further includes performing by the computing device training of the cluster models.

In some embodiments, a cluster model is trained when a number of members of a corresponding client clusters has increased by a predetermined threshold since the last training of the cluster model. Alternatively, a cluster model is trained periodically.

In some embodiments, the grouping of the clients and the training of the cluster models are performed offline by utilizing a second database such that the client clusters and the cluster models in the first database are not affected during the grouping and the training.

In some embodiments, the method further includes assigning a new client who does not have a hiring history to one of the plurality of client clusters.

In some embodiments, the method further includes receiving by the computing device an application submitted by a contractor for an opening created by the client, accessing by the computing device from the first database the client cluster that the client is grouped in and the cluster model that is associated with the client cluster, scoring by the computing device the application submitted by the contractor for the opening based on the cluster model, and based on the scoring, determining by the computing device whether to recommend the contractor to the client as a candidate for the job opening.

In some embodiments, the method further includes re-scoring by the computing device all existing application to active openings in the online work marketplace.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Understanding and modeling the hiring behavior of clients of a marketplace is challenging not only due to the variety of jobs that are posted and the diversity of contractors in the marketplace, but also due to the heterogeneity of client hiring criteria. For example, two different clients in the marketplace who have posted two seemingly similar jobs looking for "php developers" may be looking for totally different people. The first client may be a quality optimizer who is willing to pay a high hourly rate to get the most qualified contractor, while the second client may be a cost optimizer who is willing to take the risk of working with an inexperienced contractor to reduce his costs. To make recommendations that satisfy both of these clients, there would be a dedicated model for each client. However, developing a model for each client is not realistic since the marketplace rarely has sufficient data points for a single client to make training possible.

Figure 1:
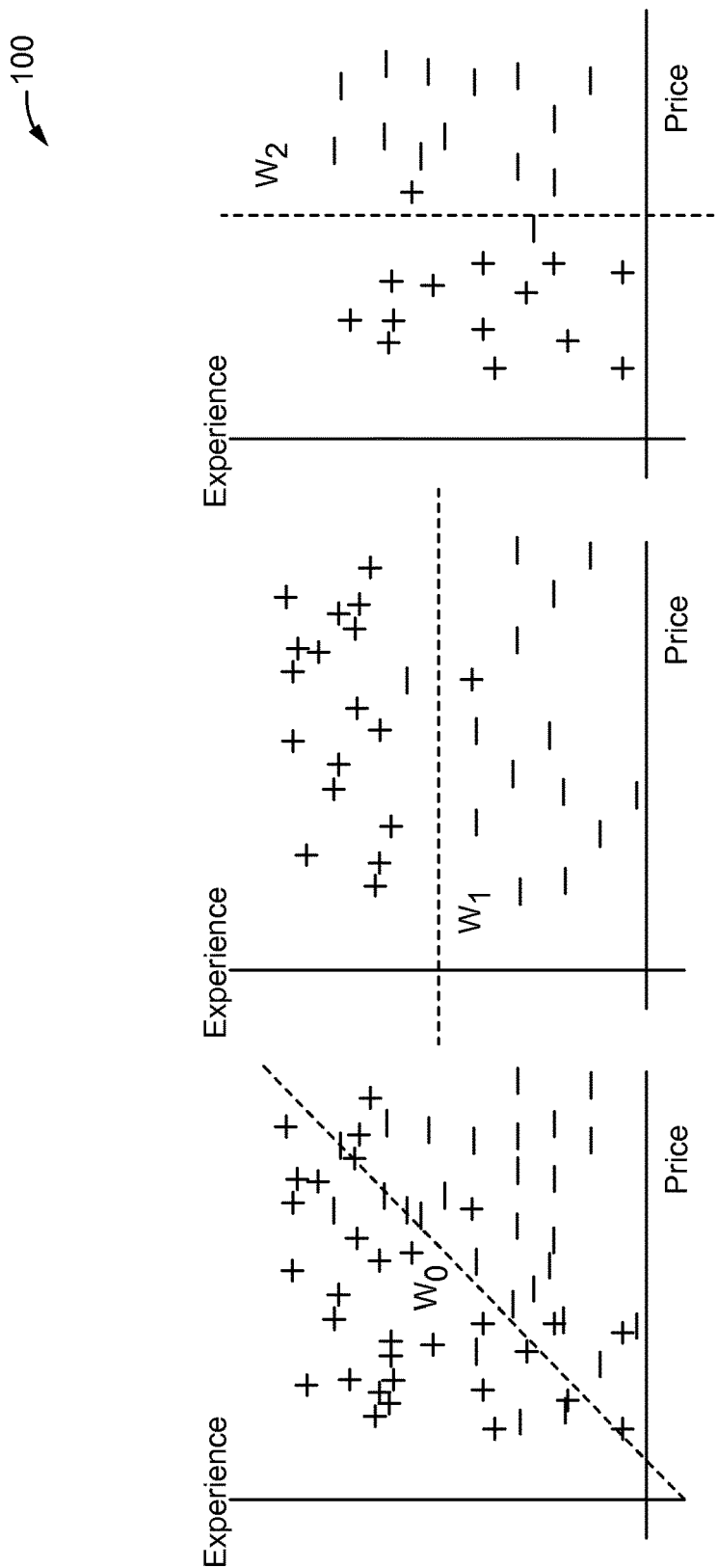
FIG. 1 illustrates exemplary plots depicting hiring decisions in a marketplace that is composed of quality and cost optimizers.

However, although all clients are not the same, there are usually sufficiently large groups of clients with similar hiring criteria that can provide data for model training. To illustrate this, FIG. 1 illustrates exemplary plots depicting hiring decisions in a marketplace that is composed of quality and cost optimizers. The first (left) plot of the FIG. 1 includes the hiring decisions of all clients of the marketplace in a two-dimensional feature space. Each "+" point represents an application that ended up in a hire, while a "−" point represents an application that got rejected. The X-axis indicates the bid prices asked by contractors and the Y-axis indicates the years of contractor experience. A linear model trained on all of the client decisions would "learn" a linear separator w0 to distinguish hired from rejected applications. However, this separator incorrectly classifies many rejected applications as hires ("−" points to the left of w0) and many hires as rejected applications ("+" points to the right of w0). However, if the clients were split into two plots representing quality (middle plot) and cost optimizers (right plot), a different model for each client group can be established and optimized. The derived separators w1 and w2 would then almost perfectly separate the hires in each of the two groups.

Embodiments of the present invention are directed to grouping clients in a work marketplace into clusters such that, in each cluster, clients are similar with respect to their hiring criteria. In some embodiments, the clusters are generated based on a clustering algorithm that can be applied effectively on large datasets. This separation allows the work marketplace to discover differences in client hiring criteria, to learn more accurately the hiring criteria in each cluster and to recommend the right contractor to each client for a successful collaboration, thereby improving matching between clients and contractors in the work marketplace. For each contractor who have submitted an application to a project posted by a client, a contractor/opening pair score is determined based on information of the cluster that is associated with the client. The contractor/opening pair score is used to ascertain whether the contractor would be a candidate recommended to the client.

Figure 2:
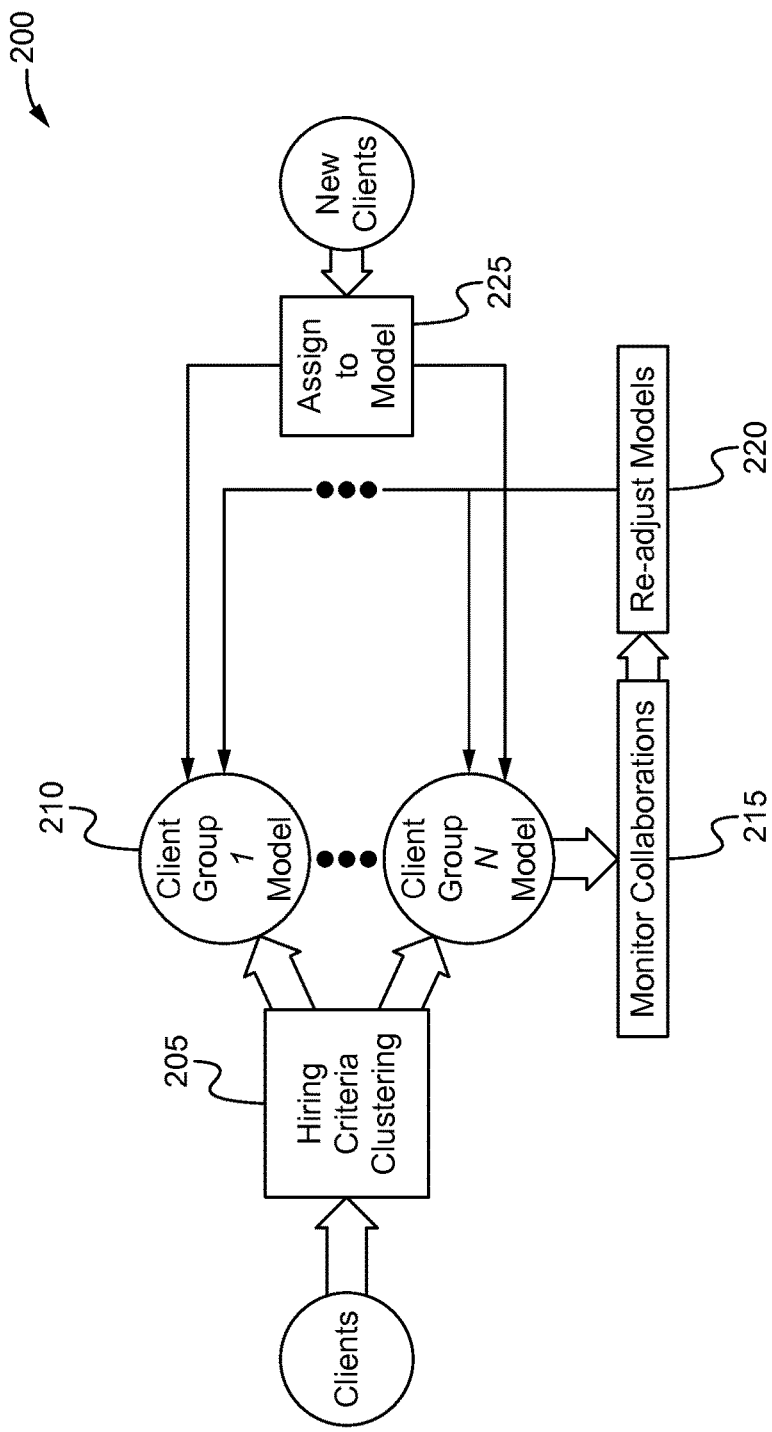
FIG. 2 illustrates an exemplary recommendations workflow in a marketplace in accordance with some embodiments.

FIG. 2 illustrates an exemplary recommendations workflow 200 in a marketplace in accordance with some embodiments. A clustering component 205 generates clusters or groups 210 of clients along with one hiring model per group. An objective of grouping or clustering clients is to predict more accurately who is the right contractor for a client's task, based on the hiring practices of that client. In addition, since unsuccessful collaborations often take place (because of clients rely on "wrong" hiring practices), a monitoring component 215 monitors collaborations in each group 210 of clients. The marketplace "intervenes" when it has detected that a group's hiring practices often lead to unsuccessful collaborations. The marketplace "intervenes" by automatically adjusting the group's hiring model based on the "problematic" criteria that is detected. For example, a hiring model is re-adjusted by a re-adjustment component 220 when it is detected that clients are biased against working with contractors from specific countries, while it is known that those countries provide a large pool of experts for the tasks posted by those clients. The monitoring component 215 and the re-adjustment component 220 typically require both algorithmic models and manual effort. Hence, it is important to use human-interpretable hiring models in the workflow 200. Furthermore, the workflow 200 also involves an assignment component 225 that assigns new clients without any hiring history to the right group/model 210. A positive experience for new clients is typically important for the marketplace.

Figure 3:
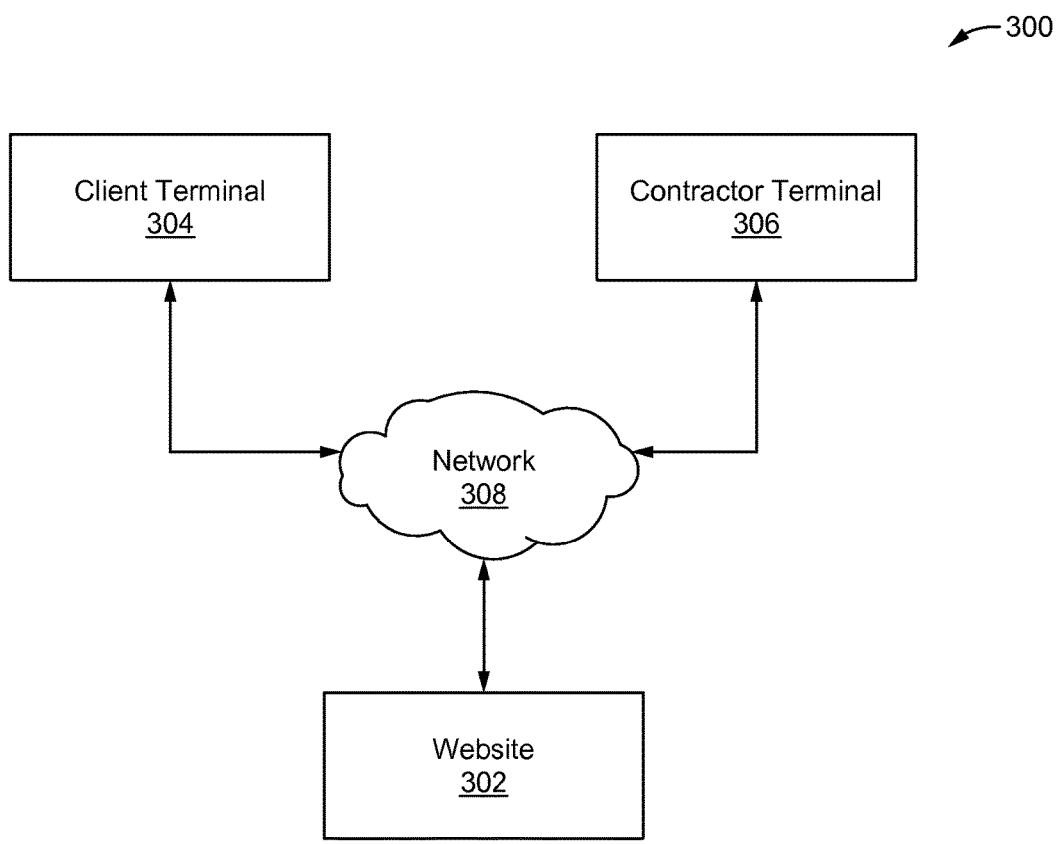
FIG. 3 is a diagram of an exemplary system in accordance to some embodiments.

FIG. 3 is a diagram of an exemplary system 300 in accordance to some embodiments. The system 300 includes an online marketplace 302, a client terminal 304, a contractor terminal 306 and a network(s) 308, such as the Internet. The client terminal 304, the contractor terminal 306 and the marketplace 302 are all communicatively coupled via the network 308. The marketplace 302 includes a plurality of members and hosts a website that allows its members, such as a client and a contractor, to communicate via their terminals 304, 306 using the website. In some embodiment, the client terminal 304 and the contractor terminal 306 may include one or more computer systems such as desktop computers, laptop computers, network computers, handheld data storage devices, wireless communication devices, cellular telephones, etc. Some embodiments of the present invention are implemented in a client-server environment as shown in FIG. 3. The Internet is one example of a client-server environment. However, any other appropriate type of client-server environment, such as an intranet, a wireless network, a telephone network, etc., may also be used. The present invention is not limited to the client-server model and could be implemented using any other appropriate model. The described embodiment uses the world wide web, although other protocols may be used and other, newer versions of the web may also be used. The members of the marketplace 302 include a plurality of clients and a plurality of contractors, although a single client and a single contractor are shown in FIG. 3 for ease of illustration.

In some embodiments, the marketplace 302 is a work marketplace for hiring and working "on demand." In the marketplace 302, clients find and hire contractors "on demand" to get projects done quickly and cost effectively. A client can be an individual or a firm. Likewise, a contractor can be an individual or a firm. While the client is able to post projects and search for contractors in the marketplace 302, the contractor is able to search for and submit applications to projects they want to work on. The contractor is also able to create a profile within the marketplace 302 to be immediately connected to the clients looking for the contractor's expertise. The marketplace 302 enables activities such as establishing communication between its members (e.g., clients and contractors) and recommending contractors to clients.

Figure 4:
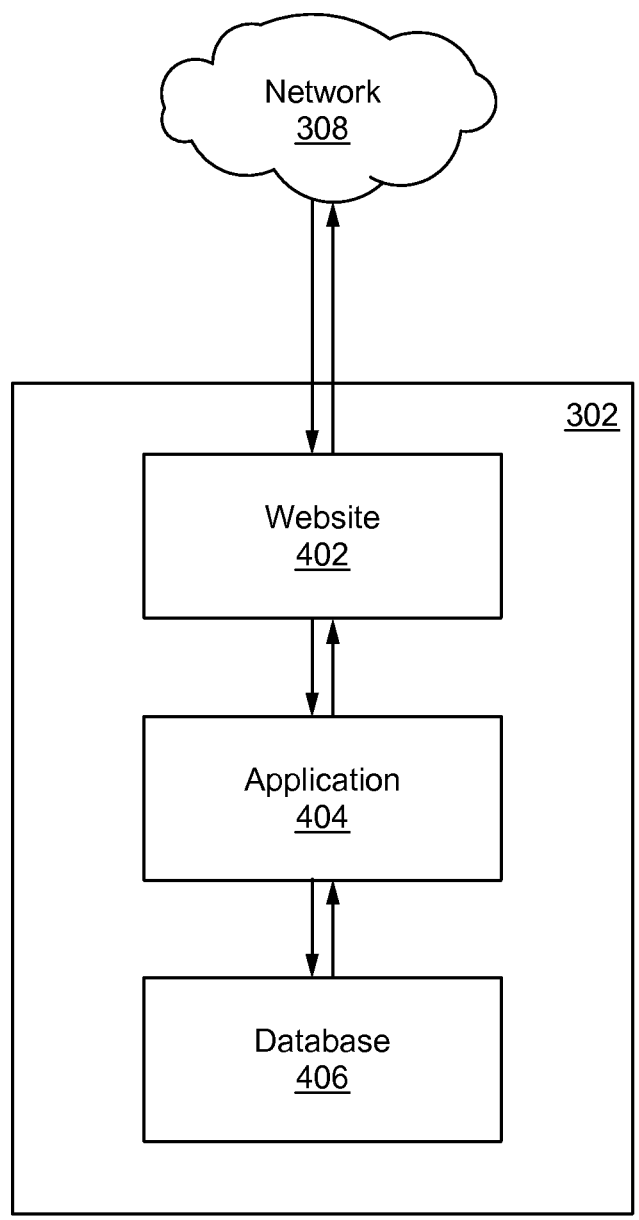
FIG. 4 is a diagram of the marketplace of FIG. 3 in accordance with some embodiments.

FIG. 4 is a diagram of the marketplace 302 of FIG. 3 in accordance with some embodiments. The marketplace 302 includes a web server(s) 402, software program(s) or application(s) 404 and a database(s) 406. The web server 402 provides the marketplace 302 connection to the network 308. The application 404 implements steps necessary to communicate with the client terminal 304 and the contractor terminal 306. The application 404 further generates information based on the communications with the client terminal 304 and the contractor terminal 306. In some embodiments, the application 404 includes a clustering algorithm to cluster clients to thereby learn more accurately the hiring criteria in each cluster and performs the recommendation workflow 200 of FIG. 2 to recommend the right contractor to each client. The database 406 includes memory storage of information received from the client terminal 304 and the contractor terminal 306 and information generated by the application 404. The marketplace 302 can be implemented using one or more computer systems.

Figure 5:
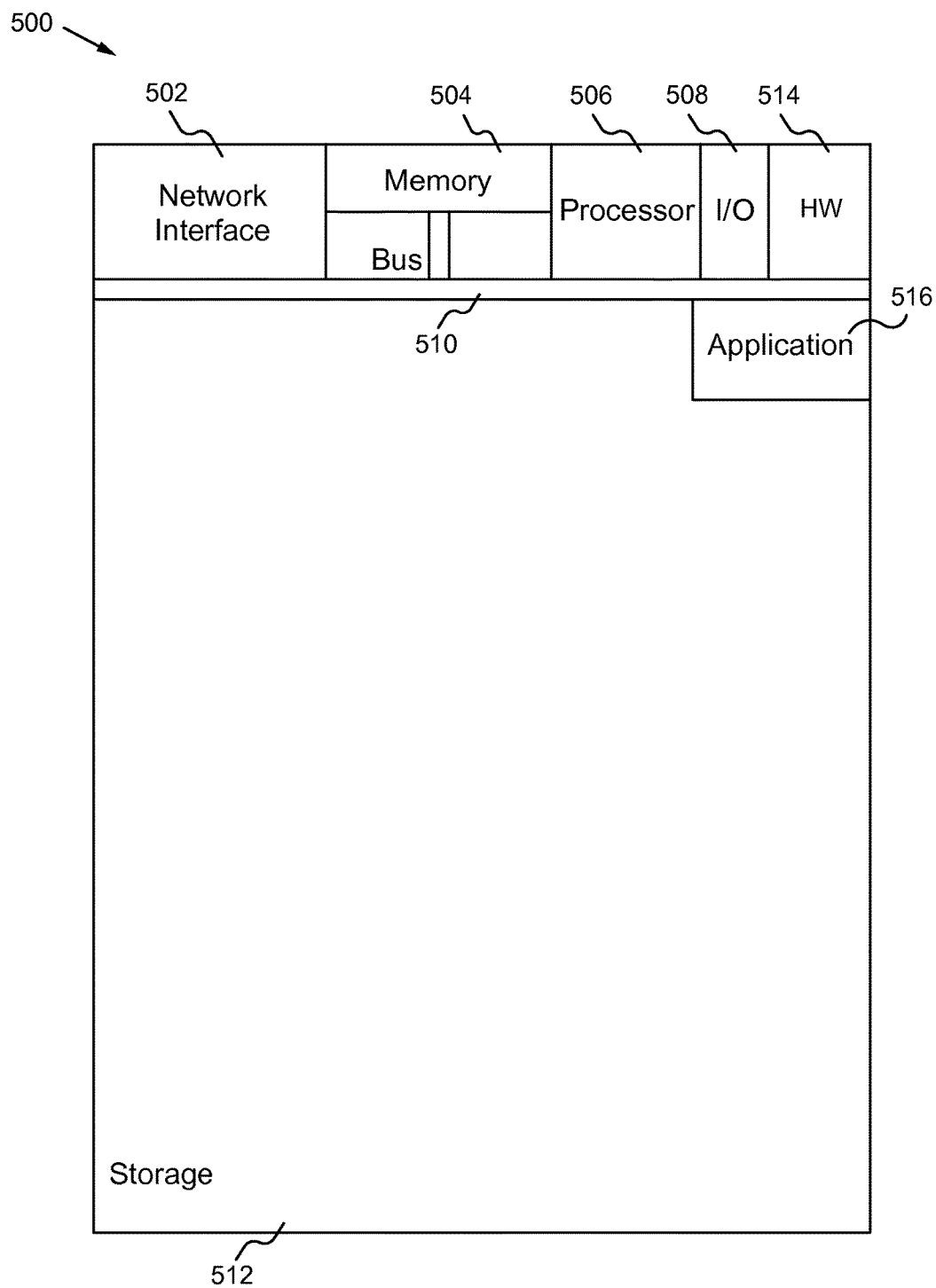
FIG. 5 illustrates a block diagram of an exemplary computing device in accordance with some embodiments.

The generation and storage of information is performed by instructions stored in a memory and executed by a computer processor on a computing device, although the invention is not limited to this embodiment. FIG. 5 illustrates a block diagram of an exemplary computing device 500 in accordance with some embodiments. The computing device 500 is able to be used to acquire, cache, store, compute, search, transfer, communicate and/or display information. A cluster engine is implemented on the computing device 500 or a plurality of computing devices 500.

In general, a hardware structure suitable for implementing the computing device 500 includes a network interface 502, a memory 504, processor(s) 506, I/O device(s) 508, a bus 510 and a storage device 512. The choice of processor 506 is not critical as long as a suitable processor with sufficient speed is chosen. In some embodiments, the computing device 500 includes a plurality of processors 506. The memory 504 is able to be any conventional computer memory known in the art. The storage device 512 is able to include a hard drive, CDROM, CDRW, DVD, DVDRW, flash memory card, RAM, ROM, EPROM, EEPROM or any other storage device. The computing device 500 is able to include one or more network interfaces 502. An example of a network interface includes a network card connected to an Ethernet or other type of LAN. The I/O device(s) 308 are able to include one or more of the following: keyboard, mouse, monitor, display, printer, modem, touchscreen, button interface and other devices. Software 516 used to cluster clients is likely to be stored in the storage device 512 and memory 504 and processed as an application is typically processed. More or less components shown in FIG. 5 are able to be included in the computing device 500. In some embodiments, hardware 514 for implementing clustering is included. Although the computing device 500 in FIG. 5 includes applications 516 and hardware 514 for implementing clustering, clustering is able to be implemented on a computing device in hardware, firmware, software or any combination thereof. For example, in some embodiments, the clustering software 516 is programmed in a memory and executed using a processor. In another example, in some embodiments, the clustering hardware 514 is programmed hardware logic including gates specifically designed to implement the method(s) discussed herein.

Examples of suitable computing devices include a personal computer, laptop computer, computer workstation, a server, mainframe computer, mini-computer, handheld computer, personal digital assistant, cellular/mobile telephone, smart appliance, gaming console or any suitable computing device such as special purpose devices.

Referring back to FIG. 4, the database 406 is a relational database. Alternatively, the database 406 is a non-relational database, such as a graph database or a document storage engine or any other NoSQL database. In some embodiments, the clustering algorithm utilizes three main tables: an Applications table, a Membership table and a Models table. Each of the three main tables is now briefly described but will become clear as clustering is further discussed.

In some embodiments, the Applications table includes columns (Contractor, Opening, Client, Score, Decision: "Approved" or "Rejected" or "Undecided"). The Applications table stores information about hiring/rejection decisions made by clients relating to applications submitted to a job opening. Every time a contractor F applies to a job opening O by a client C, a new row is added to the Applications table: (F, O, C, Null, "Undecided"). The row is updated either when the client hires the contractor (the value in the Decision column becomes "Approved"), when the client rejects the contractor (the value in the Decision column becomes "Rejected"), when the client closes his opening without any action on the contractor application (the value in the Decision column becomes "Rejected") or when the clustering algorithm calculates a new score for the contractor application (the new value is stored in the Score column).

In some embodiments, the Membership table includes columns (Client, Cluster). The Membership table maintains cluster information for each client. In some embodiment, each client belongs to a single cluster. The Membership table is updated when a new client enters the system or when clients change clusters.

In some embodiment, the Models table includes columns (Cluster, Cluster Weight). The Models table stores hiring model information for every client cluster. The Models table gets updated whenever a new model is trained for the clients of a cluster.

An application submitted by a contractor in response to a job opening, is scored at the time it is received by the marketplace. The marketplace updates the application score of the application at various events such as when the contractor changes qualifications or availability, when another contractor applies to the same opening, when the client acts on other applications of the same opening (e.g., the client interviews a candidate with lower hourly rate), and the like. Any time an application submitted by a contractor is (re-)scored, the marketplace updates the column score of the Applications table.

Figure 6:
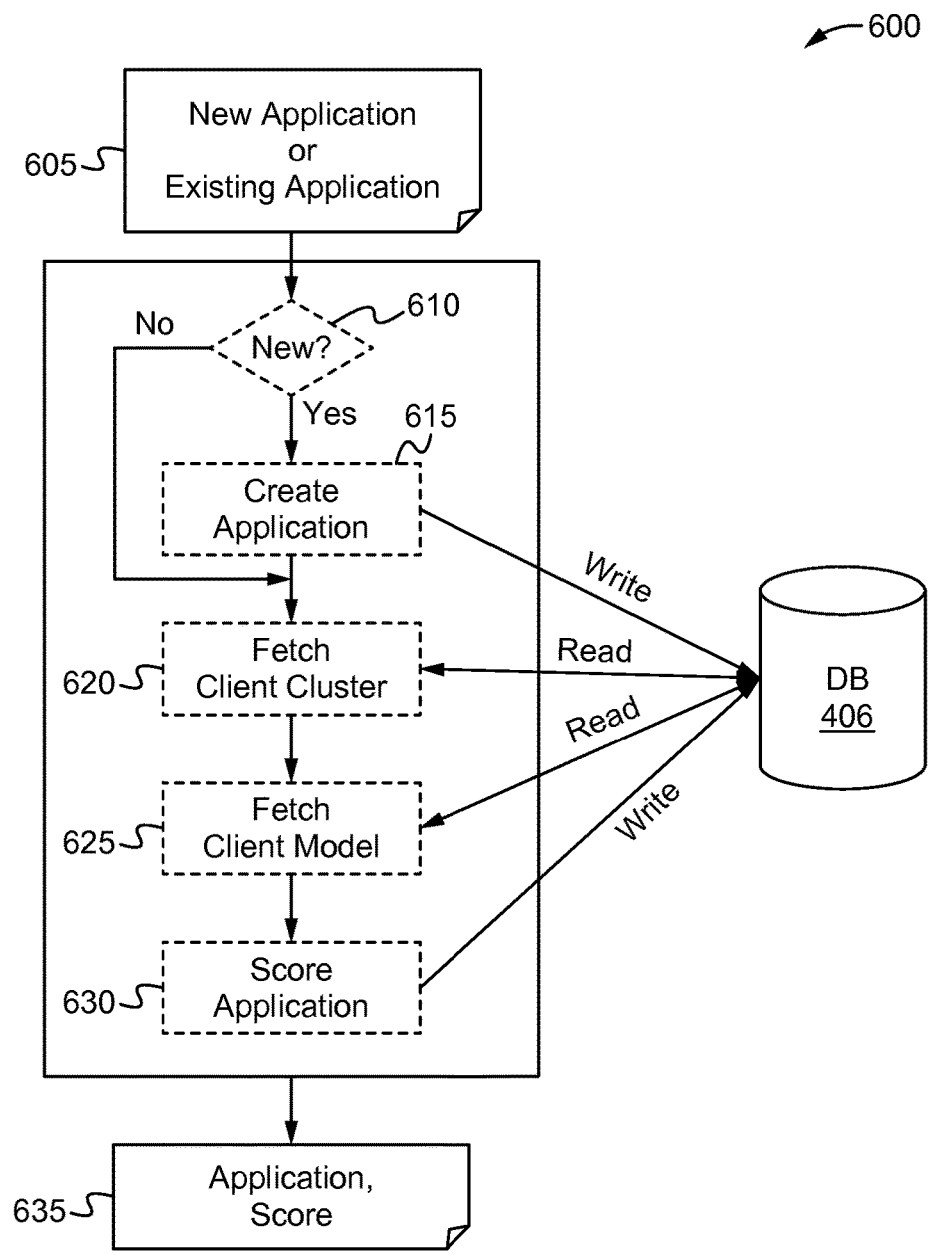
FIG. 6 illustrates an exemplary method of determining an application score in accordance with some embodiments.

FIG. 6 illustrates an exemplary method 600 of determining an application score in accordance with some embodiments. The method 600 access the database 406 of FIG. 4. At a step 605, an application is received. At a step 610, it is determined whether the application received at the step 605 is new or existing. If it is determined at the step 610 that the application is new, then a new row for the application is added to the Applications table at a step 615. At a step 620, client cluster that is associated with the client who has an opening that the application is submitted to, is read from the database 606. In some embodiments, the client cluster is retrieved from the Membership table. At a step 625, cluster model (e.g., hiring model) associated with the client cluster is read from the database 606. In some embodiments, the cluster model is retrieved from the Models table. At a step 630, the application is scored and this contractor/opening pair score is written to the database 406. The contractor/opening pair score is used by the marketplace to determine whether to recommend the contractor to the client.

The contractor/opening pair scoring requires that clients have been clustered and a model for each cluster is trained. In some embodiments, the marketplace uses offline clustering and model training for periodic updates to keep the cluster model up-to-date with the evolving patterns of hiring decisions. The periodic re-training can happen as often as monthly, weekly or daily. Offline training can also be triggered when the members of a cluster have change significantly, e.g., more than 10% of new clients have been added since the last time it was trained.

Figure 7:
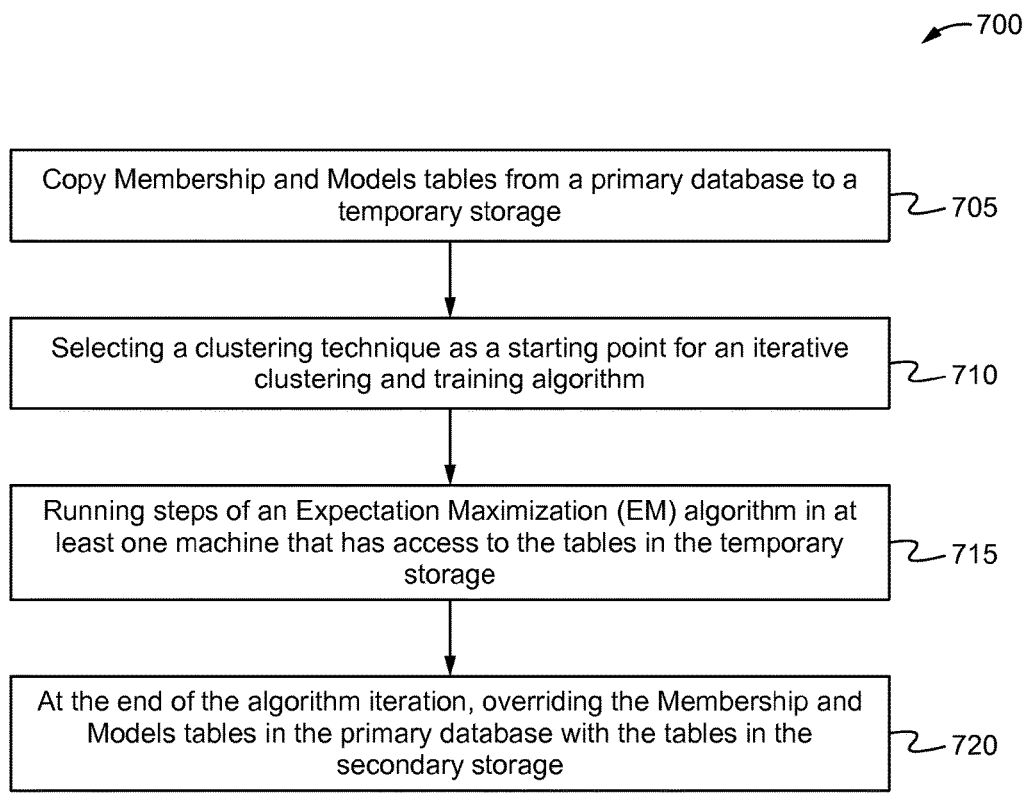
FIG. 7 illustrates an exemplary method of offline clustering and model training in accordance with some embodiments.

FIG. 7 illustrates an exemplary method 700 of offline clustering and model training in accordance with some embodiments. At a step 705, the Membership and the Models tables are copied from a primary database (e.g., the database 406 of FIG. 4) to a temporary storage space such as the computer memory, computer files or a secondary database so that the primary database is not affected. At a step 710, an existing clustering technique or some other clustering technique, e.g., random, is selected to use as a starting point for the iterative clustering and training algorithm. At a step 715, steps of an Expectation Maximization (EM) algorithm is run in a single or multiple machines that all have access to the tables stored in the temporary storage. In some embodiments, if the algorithm runs on multiple machines, then each machine has to wait until all of the machines have executed the current iteration step and have stored the intermediate results before proceeding to the next step. During the algorithm iterations, the table that has the mapping of every client to the cluster that the client belongs to and the table that has the mapping of every cluster to the model that is trained upon the hiring decisions of the cluster employers that are located in the temporary storage are updated. At a step 720, at the end of the algorithm iteration, the production Membership and Models tables in the primary database are overwritten with these tables in the secondary storage. The new models will then be used for all the new contractor/opening pairs to be scored. A process to re-score all of the existing applications to active openings can be automatically or manually activated to guarantee eventual consistency of the active opening application scores. Details of the EM algorithm is discussed elsewhere.

Model training can be expensive. As such, in some embodiments, model training occurs during the offline cycle. Alternatively or in addition to, model training can occur during the online cycle. However, the cluster membership of clients can be changed in an online fashion to provide clients with predictions that are aligned with their recent hiring decisions. An exemplary action that triggers a clustering membership update is when a client makes a hiring decision or closes an opening. When the client makes a hiring decision or closes an opening, the latest hiring decision of the client is run against the models of various clusters, and the client is moved to the cluster that would best predict the client's action. Another exemplary action that triggers a clustering membership update is when a new client arrives. When a new client posts a new job, the new client is assigned to a cluster with one of the following policies: (1) assignment to a random cluster, (2) assignment to the biggest cluster, or (3) assignment to a cluster based on the client's similarity with the other clients in that cluster. Other actions that trigger such an update are contemplated.

In the following hypothetical, assume that there are three features —experience, score, and bidding—affecting a client's decision and that all information for contractors' applications are organized in a single table: Applications (Client, Experience, Rating, Bidding, Decision). Note that for simplicity, other columns are omitted. The semantics of the five columns are "Client" which refers to the client who opened the task to which the current application refers, "Experience" which refers to the total number of hours the contractor (applicant) has worked in the marketplace, such as the total number of hours in the contractors past contracts with clients, "Rating" which refers to the aggregated rating of the contractor based on the past reviews from the clients she worked for, "Bidding" which refers to the amount asked by the contractor for performing the task, and "Decision" which refers to the decision of the client (e.g., Approved, Rejected) on this application. In some embodiments, the three features (e.g., experience, rating, and bidding) are normalized so that their value range is [0.0, 1.0]. For example, the bidding can be normalized by the maximum amount a contractor may ask for a task.

Although not used in the running hypothetical, other features that can affect the client's decision are listed in Table 1.

TABLE 1

| Features | Description |
|---|---|
| Contractor's Rating (Score) | A score summarizing how good the contractor is, based on the feedback received from clients that worked with the contractor. |
| Matched Skills | Similarity between the set of skills the contractor has in her profile and the set of skills required for the task. |
| Contractor's Total Hours | The aggregated number of hours for the contracts the contractor had in the platform (marketplace). |
| Bid Amount | The fixed amount of money the contractor asks for completing the task she applies for. |
| Bid Rate | The hourly rate earnings the contractor asks for completing the task she applies for. |
| Independent Contractor | Indicates if the contractor is a company or agency that runs a profile in the platform. |
| Contractor's Assignments | The number of tasks the contractor is assigned to and haven't been completed. |
| Contractor's Total Revenue | The aggregated earnings of the contractor in the platform. |
| Contractor's Tests Passed | The number of tests that the contractor has taken and successfully completed in the platform. |

TABLE 1-continued

| Features | Description |
|---|---|
| Contractor's Bill Rate | The hourly rate the contractor charges for the tasks he gets. Contractors usually set their bill rate in their profile to indicate the "quality" of their work. |
| Contractor's Experience | A score summarizing the working experience of the contractor based on her resume. |
| Contractor's Portfolio Items | The number of items the contractor has in her portfolio. |
| Matched Cost | The distance between the asking price and the price the client indicates she is willing to pay for the task. |
| Matched Region | Indicates if the contractor's geographical region matches one of the regions the client prefers. |
| Matched Task Category | Indicates if the task category is one of the categories the contractor has specified in her profile, as her areas of expertise. |
| Contractor's Recent Activity | A score summarizing the contractor's recent activity, e.g., tasks recently completed or the date she completed the last task. |
| Contractor's English Skills | A score summarizing how fluently the contractor speaks English. |
| Contractor's Profile Information | A score summarizing how detailed the contractor's profile information is, e.g., full name appearing or not. |
| Contractor's Active Interviews | The number of pending applications the contractor has made, where the client has responded back to him and are thus considered as the active interviews. |
| Contractor's Rank Percentile | For each test a contractor passes, she receives a score. This feature gives in which percentile the contractor belongs, based on her test scores. |

In the running hypothetical, further assume that the dataset consists of only four clients, each having ten contractor applications approved and ten contractor applications rejected. In addition, assume that, in the running hypothetical, we want to form two clusters with two clients in each group such that the clients in each group have "very similar" criteria regarding experience, rating, and bidding of an application.

Model

In this section, the problem of finding the optimal client partition based on the clients' hiring criteria is defined. In some embodiments, the definition requires that the reject/accept applications in each cluster of clients are as well-separated as possible. For example, the reject/accept applications ("–"s/"+"s) in the middle and right side of FIG. 1 are well-separated; a different partition of clients into two clusters could result in having "+"s diffuse over the "–"s area, and the opposite. In some embodiment, a logit model is used to quantify how well-separated the applications in one cluster are. Based on the cost defined by the logit model, the optimal partition of clients is the one minimizing the aggregate cost across all clusters.

The following discussion first describes the dataset notation and the cost for a single cluster and then defines the clustering optimization problem (equations (11) to (13)).

Dataset Notation. All the past applications are stored in a single table: Applications(Client, a1, a2, . . . , aF, Decision). The features describing each application are denoted by a1, a2, . . . , aF, where F denotes the number of features, and they are normalized so that their value range is [0.0, 1.0]. In the running hypothetical, only three features are used: a1 Experience, a2=Rating, and a3=Bidding.

$x_i$ denotes the row i in table Applications (Applications[i]), projected over columns a1, a2, . . . , aF. In the running hypothetical, each $x_i$ is a 3-dimensional vector. As such, if an application involves an experience of 0.2, a rating of 0.9, and a bidding of 0.8, then $x_i=(0.2, 0.9, 0.8)^T$.

$u_i$ expresses the Client of row i (Applications[i].Client), in a 1-of-K scheme, where K denotes the number of client. In the running example, where K=4 clients, if the second client approved/rejected application i, then $u_i=(0, 1, 0, 0)^T$.

To simplify notation, past applications are split into two subsets {P, N}, such that:

$$P=\{(x_i, u_1) | \text{Applications}[i].\text{Decision}=\text{Approved}\} \quad (1)$$

$$N=\{(x_i, u_i) | \text{Applications}[i].\text{Decision}=\text{Rejected}\} \quad (2)$$

In the running hypothetical, |P|=40 since each of the four clients has approved ten contractor applications, and |N|=40 since each of the four clients has rejected ten applications.

Single-Cluster Cost. The single-cluster cost is based on the logistic regression model. The following provides a brief overview of logistic regression in the context of the running hypothetical, where the applications {P, N} of the clients belong to a single cluster.

w denotes the vector expressing the criteria of clients for approving/rejecting the applications. Note that all the clients of a cluster share the same w. In the running hypothetical, a $w=(1.0, 0.0, 0.0)^T$ expresses that clients prefer contractors with a lot of experience and do not care about the rating and the bidding in an application. In some embodiments, w involves an additional coefficient for the general bias. That is, in the running hypothetical, an application $x_i=(0.2, 0.9, 0.8)^T$ would be extended with a constant term on a fourth dimension: $x_i$ would become $(0.2, 0.9, 0.8, 1.0)^T$, and w would become a 4-dimensional vector.

In logistic regression, the probability of an application i being approved is given by the logistic function:

$$g(w^T x_i) = \frac{1}{1 + e^{-w^T x_i}} \quad (3)$$

That is, $$P(x_i \text{ approved}|w) = g(w^T x_i) \quad (4)$$

$$P(x_i \text{ rejected}|w) = 1 - g(w^T x_i) \quad (5)$$

Therefore, as the value of the dot product $w^T x_i$ approaches $+\infty$, $P(x_i \text{ approved}|w)$ approaches 1.0, while as the value of the dot product $w^T x_i$ approaches $-\infty$, $P(x_i \text{ rejected}|w)$ approaches 1.0.

The objective in logistic regression is finding the criteria w, maximizing the likelihood:

$$P(\{\mathcal{P}, \mathcal{N}\} | w) = \prod_{\mathcal{P}} g(w^T x_i) \prod_{\mathcal{N}} (1 - g(w^T x_i)) \quad (6)$$

Taking into account regularization, the cost of a single cluster is the negative log-likelihood plus a regularization term involving a hyperparameter λ and the 1-norm of the criteria vector w:

$$\text{Cost}(w): \lambda \|w\|_1 - \sum_{\mathcal{P}} \ln(g(w^T x_i)) - \sum_{\mathcal{N}} \ln(1 - g(w^T x_i)) \quad (7)$$

Optimal Client Partitioning. In this section, the model is generalized to many clusters. Thus, the dataset {P, N} refers to the applications from all clients.

The matrix $M=[m_1, \ldots, m_C] \in \{0, 1\}^{K \times C}$ is used to express the clients' membership, e.g., how the K clients are partitioned into C clusters. Column j, $m_j$, gives the clients that belong to cluster j, while $m'_k$ denotes the row k of M, which gives the cluster where client k belongs. In the running hypothetical, suppose that the first cluster contains only the third client while the second cluster contains the other three clients. In that case, $$m_1 = \begin{pmatrix} 0 \\ 0 \\ 1 \\ 0 \end{pmatrix}, m_2 = \begin{pmatrix} 1 \\ 1 \\ 0 \\ 1 \end{pmatrix}, M = \begin{pmatrix} 0 & 1 \\ 0 & 1 \\ 1 & 0 \\ 0 & 1 \end{pmatrix}$$

and $m'_1=(0, 1)$, $m'_2=(0, 1)$, $m'_3=(1, 0)$, and $m'_4=(0, 1)$.

Therefore, the dot product $u_i^T m_j$ is 1 if the client that approved/rejected application i belongs to cluster j and 0 otherwise. For example, if the second client approved/rejected application i and the clustering is the same as in the example above, then $u_i^T m_1=(0, 1, 0, 0)(0, 0, 1, 0)^T=0$, while $u_i^T m_2=(0, 1, 0, 0)(1, 1, 0, 1)^T=1$.

The criteria vector for cluster j is given by $w_j$. The matrix $W=[w_1, \ldots, w_C] \in \mathbb{R}^{F \times C}$ refers to the union of vectors for all clusters.

The likelihood of the evidence $P(\{P, N\}|W, M)$ becomes:

$$\prod_{j=1}^{C} \left( \prod_{\mathcal{P}} g(w_j^T x_i)^{u_i^T m_j} \prod_{\mathcal{N}} (1 - g(w_j^T x_i))^{u_i^T m_j} \right) \quad (8)$$

Note that the term for a cluster j involves only the applications of clients that belong to that cluster. For all of these applications the exponent $u_i^T m_j$ is 1, while for all other applications that do not belong to the cluster j the exponent $u_i^T m_j$ is 0.

The log-likelihood, l(W, M), becomes:

$$\sum_{j=1}^{C} \left( \sum_{\mathcal{P}} u_i^T m_j \ln(g(w_j^T x_i)) + \sum_{\mathcal{N}} u_i^T m_j \ln(1 - g(w_j^T x_i)) \right) \quad (9)$$

Therefore, the cost of a client partition defined by membership and criteria matrices M and W is:

$$\text{Cost}(W, M): \lambda \sum_{j=1}^{C} \|w_j\|_1 - \ell(W, M) \quad (10)$$

The cost involves the sum of the regularization terms for each cluster.

One objective is to find the membership and criteria matrices that solve the following optimization problem:

$$\min_{W, M} \text{Cost}(W, M) \quad (11)$$

$$\text{s.t. } \|m'_k\|_1 = 1, \forall k \in \{1, \ldots, K\} \quad (12)$$

$$M \in \{0, 1\}^{K \times C}, W \in \mathbb{R}^{F \times C} \quad (13)$$

The constraint (12) expresses that each client must be part of exactly one cluster (e.g., overlapping clusters are not allowed).

Algorithm

The exhaustive approach for solving the optimization problem in equations (11)-(13) involves a $O(C^K)$ time complexity, for C clusters and K clients. A scalable algorithm based on Expectation Maximization (EM) with hard assignments is used. In each iteration, two steps are involved: (1) an E step to compute the optimal client memberships, e.g., the optimal M, while keeping W fixed, and (2) a M step to compute the optimal client criteria for each cluster, e.g., the optimal W, while keeping M fixed.

TABLE 2

| Input: | C: the number of clusters |
| --- | --- |
| | P: applications approved |
| | N: applications rejected |
| Output: | W: local-optimum criteria matrix |
| | M: local-optimum membership matrix |
| 1: | M: = randomly assign the clients into C clusters |
| 2: | while M # $M_{pre}$ do |
| 3: | $M_{pre}$: = M |
| 4: | W: = solve problem of (11)-(13), with M fixed (M step) |
| 5: | M: = solve problem of (11)-(13), with W fixed (E step) |
| 6: | end while |

Table 2 illustrates an exemplary algorithm in accordance with some embodiments. The input is the set of all clients' applications, {P, N}, along with the number of clusters C. Note that in practice there are many ways to compute the number of clusters to use as input. The simplest approach is to try several different C values and keep the one maximizing a metric like Mean Average Precision or Discounted Cumulative Gain on a testing set.

In each E step, the value of the objective function in (11) decreases or remains the same; in the worst case, there are no changes in the client memberships that would decrease the value of the objective function. Likewise, in each M step, the value of the objective function always decreases or, at least, remains the same. Hence, the algorithm eventually converges to a minimum when the client memberships remain the same for two consecutive iterations. Nevertheless, the minimum may be a local minimum and not a global one, since the problem of (11)-(13) is not convex. In practice, the algorithm is run more than once, using different initial assignments of clients to clusters, and keep the solution that gives the lowest value for the objective function.

One of the main advantages of this algorithm is its scalability. In the E step, a single pass over the clients is needed. In the M step, only C sparse logistic regression problems, e.g., one problem per cluster, need to be solved.

E step. In the E step, the criteria matrix W is fixed and each client is associated with a cluster that best "explains" the client's decisions on applications. That is, if $U_a$ is the set of applications that were approved/rejected by a client a, the log-likelihood l(W; j, $U_a$) is calculated for each cluster j:

$$\sum_{\mathcal{P} \cap U_a} \ln(g(w_j^T x_i)) + \sum_{N \cap U_a} \ln(1 - g(w_j^T x_i)) \qquad (14)$$

Then, client a is assigned to the cluster that gives the highest l(W; j, $U_a$) (or, equivalently, the lowest negative log-likelihood). In the running hypothetical, if the second cluster gives the highest l(W; j, $U_3$) for the third client, the third row of M, e.g., $m'_3$, becomes (0, 1).

At the end of E step, the assignment changes for each client will be reflected on the membership matrix M.

M step. In the M step, the membership matrix M is fixed and a criteria vector $w_j$ is found for each cluster j that best "explains" the client's decisions in that cluster. That is, for a cluster c, if U is the set of applications that were approved/rejected by the clients in c, the following sparse logistic regression problem is solved:

$$\min_{w_c} \left( \lambda \|w_c\|_t - \sum_{\mathcal{P} \cap U} \ln(g(w_c^T x_i)) - \sum_{N \cap U} \ln(1 - g(w_c^T x_i)) \right) \qquad (15)$$

The optimal solutions to the logistic regression problems form the W for the next E step.

Results and Advantages

Results from experiments applying the algorithm on production data show that identifying groups of clients with similar hiring criteria is of great importance in online work marketplaces. The model for hiring-criteria clustering and the clustering algorithm, which can be applied effectively on large datasets, significantly improve prediction accuracy for future hirings of clients. Furthermore, the analysis of the clusters generated by the algorithm reveals some interesting facts about the way different groups of clients choose contractors for their tasks: some clients are positively biased to contractors that are "new" to a marketplace (probably because many new contractors are eager to build a competitive profile), while other clients ignore the contractor's reputation and focus on how well the contractor's skills match to the task requirements. The present invention discovers such differences in client hiring criteria and can drastically improve the matching between clients and contractors in work marketplaces.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system for detecting and analyzing differences between client criteria in different clusters, comprising:
   a plurality of client clusters stored in a first database, wherein clients are grouped into the plurality of client clusters such that each client in a first of the plurality of client clusters has hiring criteria that is more similar to any other client in the first of the plurality of client clusters than to any client in a second of the plurality of client clusters;
   a cluster model for each of the plurality of client clusters stored in the first database, wherein the cluster model is based on the hiring criteria associated with a corresponding client cluster; and
   a computing device including:
      a processor; and
      an application executed by the processor, the application configured to:
         obtain the plurality of client clusters, by:
            plotting past hiring decisions of the clients in an n-dimensional feature space, wherein n is an integer greater than one, and wherein the past hiring decisions include positive hiring decisions and negative hiring decisions;

grouping the past hiring decisions in the n-dimensional feature space into the plurality of clusters such that each of the plurality of clusters has an optimal partition separating positive hiring decisions and negative hiring decisions in the cluster; and for each of the plurality of clusters, learning the hiring criteria for a respective cluster by using the past hiring decisions of only the clients in the respective cluster;

perform iterative grouping of the clients such that candidate recommendations made by the computing device for a client are aligned with the hiring criteria of the cluster model that is associated with the client cluster the client is grouped in;

receive an application submitted by a contractor for an opening created by the client;

access from the first database the client cluster that the client is grouped in and the cluster model that is associated with the client cluster;

score the application submitted by the contractor for the opening based on the cluster model, wherein the scoring based on the cluster model associated with the client establishes a prediction that is aligned with hiring decisions of the client; and based on the scoring, determine whether to recommend the contractor to the client as a candidate for the job opening.

2. The system of claim 1, wherein the application is also configured to:

generate the plurality of client clusters;

generate the cluster model for each of the plurality of client clusters;

monitor collaborations in each of the plurality of client clusters; and based on the monitoring, re-adjust one or more of the cluster models.

3. The system of claim 2, wherein the application is also configured to:

perform training of the cluster models.

4. The system of claim 3, wherein a cluster model is trained when a number of members of a corresponding client clusters has increased by a predetermined threshold since the last training of the cluster model.

5. The system of claim 3, wherein a cluster model is re-trained.

6. The system of claim 3, wherein the grouping of the clients and the training of the cluster models are performed offline by utilizing a second database such that the client clusters and the cluster models in the first database are not affected during the grouping and the training.

7. The system of claim 2, wherein the application is also configured to:

assign a new client who does not have a hiring history to one of the plurality of client clusters.

8. The system of claim 1, wherein the clients and the contractors are members of an online work marketplace.

9. The system of claim 1, wherein the application is also configured to:

re-score all existing application to active openings in the online work marketplace.

10. A computing device including:

a processor; and an application executed by the processor, the application configured to:

obtain a plurality of client clusters, by:

plotting past hiring decisions of clients in an n-dimensional feature space, wherein n is an integer greater than one, and wherein the past hiring decisions include positive hiring decisions and negative hiring decisions;

grouping the past hiring decisions in the n-dimensional feature space into the plurality of clusters such that each of the plurality of clusters has an optimal partition separating positive hiring decisions and negative hiring decisions in the cluster; and for each of the plurality of clusters, learning hiring criteria for a respective cluster by using the past hiring decisions of only the clients in the respective cluster;

maintain the plurality of client clusters in a first database, wherein the clients are grouped into the plurality of client clusters such that each client in a first of the plurality of client clusters has hiring criteria that is more similar to any other client in the first of the plurality of client clusters than to any client in a second of the plurality of client clusters;

maintain a cluster model for each of the plurality of client clusters in the first database, wherein the cluster model is based on the hiring criteria associated with a corresponding client cluster;

perform iterative grouping of the clients such that candidate recommendations made by the computing device for a client are aligned with the hiring criteria of the cluster model that is associated with the client cluster the client is grouped in;

receive an application submitted by a contractor for an opening created by the client;

access from the first database the client cluster that the client is grouped in and the cluster model that is associated with the client cluster;

score the application submitted by the contractor for the opening based on the cluster model, wherein the scoring based on the cluster model associated with the client establishes a prediction that is aligned with hiring decisions of the client;

based on the scoring, determine whether to recommend the contractor to the client as a candidate for the job opening;

obtaining a hiring decision of the client regarding the contractor; and running the hiring decision of the client regarding the contractor against all cluster models to find another client cluster that better predicts the client's action than the client cluster that the client is currently grouped in.

11. A method of detecting and analyzing differences between client criteria in different clusters, comprising:

obtaining by a computing device a plurality of client clusters, by:

plotting past hiring decisions of clients in an n-dimensional feature space, wherein n is an integer greater than one, and wherein the past hiring decisions include positive hiring decisions and negative hiring decisions;

grouping the past hiring decisions in the n-dimensional feature space into the plurality of clusters such that each of the plurality of clusters has an optimal partition separating positive hiring decisions and negative hiring decisions in the cluster, wherein each of the past hiring decisions belongs to one of the plurality of clusters; and for each of the plurality of clusters, learning hiring criteria for a respective cluster by using the past hiring decisions of only the clients in the respective cluster;

maintaining by the computing device a plurality of client clusters in a first database, wherein the clients are grouped into the plurality of client clusters such that each client in a first of the plurality of client clusters has hiring criteria that is more similar to any other client in the first of the plurality of client clusters than to any client in a second of the plurality of client clusters;

maintaining by the computing device a cluster model for each of the plurality of client clusters in the first database, wherein the cluster model is based on the hiring criteria associated with a corresponding client cluster;

performing by the computing device iterative grouping of the clients such that candidate recommendations made by the computing device for a client are aligned with the hiring criteria of the cluster model that is associated with the client cluster the client is grouped in;

receiving by the computing device an application submitted by a contractor for an opening created by the client;

accessing by the computing device from the first database the client cluster that the client is grouped in and the cluster model that is associated with the client cluster;

scoring by the computing device the application submitted by the contractor for the opening based on the cluster model, wherein the scoring based on the cluster model associated with the client establishes a prediction that is aligned with hiring decisions of the client; and based on the scoring, determining by the computing device whether to recommend the contractor to the client as a candidate for the job opening.

12. The method of claim 11, further comprising:
generating by the computing device the plurality of client clusters;
generating by the computing device the cluster model for each of the plurality of client clusters;
monitoring by the computing device collaborations in each of the plurality of client clusters; and
based on the monitoring, re-adjusting by the computing device one or more of the cluster models.

13. The method of claim 12, further comprising:
performing by the computing device training of the cluster models.

14. The method of claim 13, wherein a cluster model is trained when a number of members of a corresponding client clusters has increased by a predetermined threshold since the last training of the cluster model.

15. The method of claim 13, wherein a cluster model is re-trained.

16. The method of claim 13, wherein the grouping of the clients and the training of the cluster models are performed offline by utilizing a second database such that the client clusters and the cluster models in the first database are not affected during the grouping and the training.

17. The method of claim 12, further comprising:
assigning a new client who does not have a hiring history to one of the plurality of client clusters.

18. The method of claim 11, further comprising:
re-scoring by the computing device all existing application to active openings in the online work marketplace.

19. The method of claim 11, further comprising re-scoring by the computing device the application submitted by the contractor upon a predetermined event.

20. The method of claim 19, wherein the predetermined event is when a status of the contractor changes, when another contractor applies to the same opening, or when the client acts on other applications for the same opening.

* * * * *